United States Patent [19]

Guest

[11] Patent Number: 4,867,484
[45] Date of Patent: Sep. 19, 1989

[54] BODIES WHICH USE COUPLINGS

[76] Inventor: John D. Guest, "Iona" Cannon Hill Way, Bray, Maidenhead, England

[21] Appl. No.: 224,886

[22] Filed: Jul. 27, 1988

[30] Foreign Application Priority Data

Jul. 31, 1987 [GB] United Kingdom ............. 8718198

[51] Int. Cl.[4] ............................................. F16L 55/00
[52] U.S. Cl. ................................. 285/174; 285/322; 285/382
[58] Field of Search .............. 285/322, 323, 174, 382

[56] References Cited

U.S. PATENT DOCUMENTS

| 3,909,046 | 9/1975 | Legris | 285/323 X |
| 4,103,941 | 8/1978 | Stoll | 285/322 X |
| 4,637,636 | 1/1987 | Guest | 285/323 |
| 4,645,246 | 2/1987 | Guest | 285/323 |

Primary Examiner—Dave W. Arola
Attorney, Agent, or Firm—Albert L. Jeffers; John F. Hoffman; David L. Ahlersmeyer

[57] ABSTRACT

The disclosure relates to a tube coupling (10) for a tube (11) comprising a body (12) having a throughway (13) to receive the tube through an opening (24) at one end of the body with a multi-fringered collet (26) in the open end engageable with a tapered cam surface (25) in the throughway to lock a tube in the throughway. The coupling body is formed in two parts comprising a main section (12a) in which the throughway is enlarged at (18) to receive a seal (19) for the tube and a subsidiary section (12b) in which the tapered cam surface (25) and open end (24) of the body are formed. The main section of the body is formed in a deformable metal and has a socket (30) encircling the throughway which is initially formed with a parallel sided wall (21). The subsidiary section of the body, which is conveniently formed as a plastics moulding has a tapered wall section containing the tapered cam surface, is engaged in the socket in the main section within the parallel wall portion and the latter is then swaged around the tapered wall of subsidiary section to lock the subsidiary section in the socket.

The arrangement provides a convenient and relatively cheap method of manufacturing the coupling body with its internal tapered cam surface.

6 Claims, 2 Drawing Sheets

BODIES WHICH USE COUPLINGS

BACKGROUND OF THE INVENTION

1. Field of the Invention

This invention relates to a body for a tube coupling having a throughway open at one end to receive a tube and a collet for locking the tube in the throughway.

2. Background Prior Art

Our UK Pat. No. 2132295 disclosing a tube coupling comprising a body member with a bore having an axially tapered portion, a collet having arms extending into the tapered portion of the bore. Axially outward movement of the collet causes the arms engaging the tapered portion to be pressed inwardly for gripping a tube in the bore. The outward part of the body has a series of grooves into which material of the inner part is caused to flow by said ultrasonic vibration and it is an object of this invention to avoid the necessity of applying ultrasonic to lock the parts together which may result in distortion of the inner part.

SUMMARY OF THE INVENTION

This invention provides a body for a tube coupling having a throughway open at one end to receive a tube and a collet for locking the tube in the throughway, the body having a main section and a separately formed subsidiary section containing part of the throughway which terminates in said open end and has a tapered cam surface encircling the throughway and convergent towards said open end to act on the tube locking collet, the throughway in the subsidiary section being opened at the other end of the subsidiary section to communicate with the throughway in the main section of the body member, the main section of the body member having a socket encircling the throughway at one end thereof to receive said other end of the subsidiary section, the socket including a peripheral wall which is deformed inwardly to lock the other end of the subsidiary section in the socket to form a unified body.

The main section of the coupling body may be formed in a deformable metal and the subsidiary section can be conveniently and accuratly manufactured as a plastics moulding and then joined to the main section as a foresaid without risk of distorting the cam surface in the subsidiary section.

The outer surface of the subsidiary section of the body adjacent said other end thereof may reduce in cross section away from the other end over the part of the subsidiary section encircled by the peripheral wall of the socket, said peripheral wall being deformed around the reducing cross section outer surface of the subsidiary section to lock the subsidiary section in the socket.

More specifically the peripheral wall of the socket is annular and the outer surface of the subsidiary section adjacent said other end is frusto-conical, the annular wall of the socket being deformed against the frusto-concial surface of the subsidiary section to lock the subsidiary section in the socket.

Further, the socket on the main section of the body may have an annular seat encircling the open end of the body to receive said other end of the subsidiary section, the seat being encircled by said annular wall of the socket.

In any of the above arrangements the main section of the body may be formed from a deformable metal and the peripheral wall on the main section of the body is deformed inwardly against the subsidiary section by swaging.

DESCRIPTION OF THE PREFERRED EMBODIMENT

Figure 1:
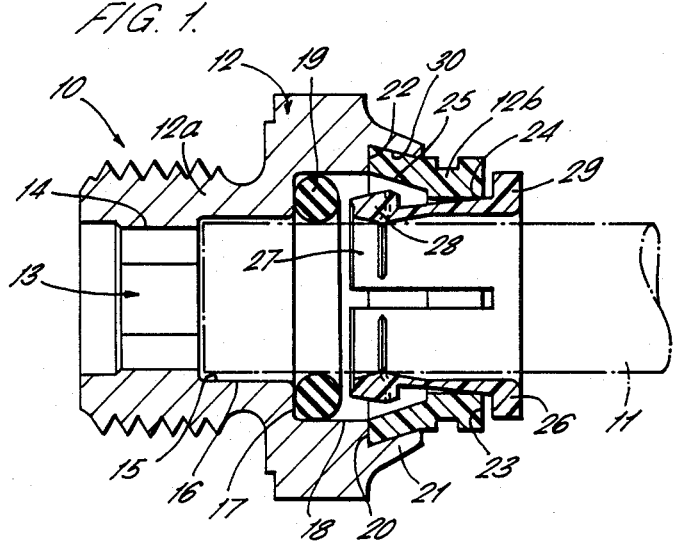
FIG. 1 is a sectional view through a tube coupling.

Referring to the drawing, there is shown a tube coupling generally at 10 for a tube 11 comprising the body 12 consisting of a main section 12a and a subsidiary section 12b. The body is formed with the throughway 13 extending through the main and subsidiary section. The throughway is formed in the main section 12a of the body by a first bore 14 which is enlarged at annular step 15 to a second bore 16 which in turn is enlarged at a second annular step 17 to a third bore 18. The step 15 provides a seat to receive an end of the tube 11 to be locked in the body, and the second step 17 provides a seat to receive an annular seal 19 to form a seal between the tube 11 and bore 18.

The bore 18 extends to the end of the main section of the body where it is encircled by a socket to receive the subsidiary section 12b. The socket comprises an annular seat 20 formed on the end of the main section of the body around the open end of the bore 18 and an annular wall 21 encircling the seat 20. The main section of the body member is formed from a deformable metal such as stainless steel.

The subsidiary section of the body which is formed in a moulded plastics material has one end 22 engaging the seat 20 and an opposite end 23 is formed with an opening 24. The throughway in the subsidiary section of the socket has a tapered internal cam surface 25 extending from said end 22 of the subsidiary section and converging towards the open end 24 of the subsidiary section. The maximum diameter of the tapered cam surface at the open end of the subsidiary section is substantially equivalent in diameter to the bore 18 in the main section to provide us with transition between the main and subsidiary sections. A collet 26 extends into the throughway in subsidiary section and has a plurality of resilient fingers 27 formed with heads 28 at the end thereof. The other ends of the heads are engagable with the cam surface 25 of the subsidiary section to press the heads inwardly to engage and grip a tube 11 within the collet. On outward movement of the collet to block the tube in the body. The locking action can be released by depressing the collet inwardly utilising the head 29 at the end of the collet projecting from the body to disengage the heads 28 from the cam surface 25.

Figure 2:
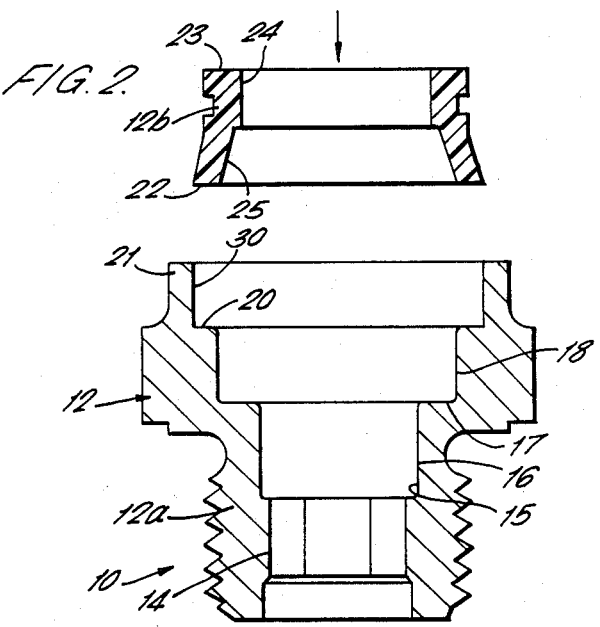
FIGS. 2 to 4 illustrated the sequence of assembly of the coupling body.
Figure 3:
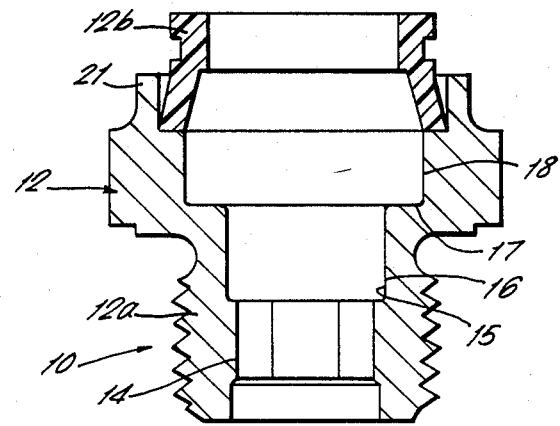
Figure 4:
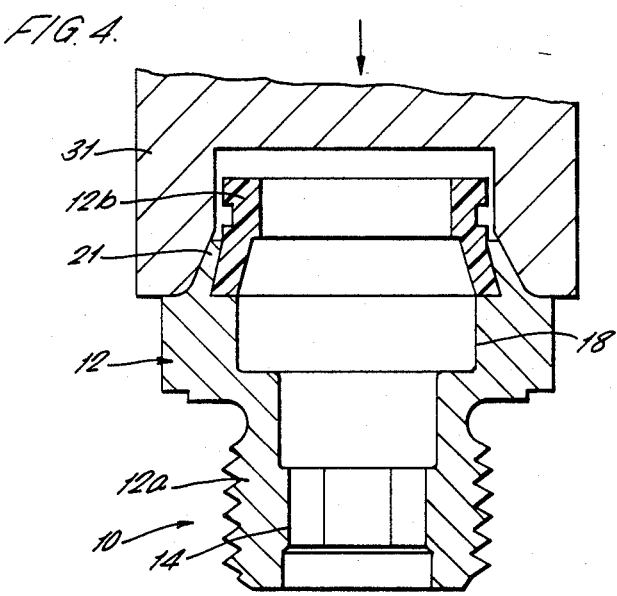

The subsidiary section 12b of the body has a frusto-conical surface 30 extending from said end 22 of the subsidiary section to provide a gradually reducing external cross section away from the end 22 of the subsidiary section. Reference is now made to FIGS. 2 to 4 of the drawings which illustrate the sequence of steps in manufacturing the coupling body. Initially the annular wall of the socket on the main section is formed parallel as shown in Figure. The end part of the subsidiary section is engaged in the socket with the end 22 of the subsidiary section against the seat 20 of the socket as shown in FIG. 3. The annular wall 21 is deformed by swaging around the frusto-conical outer surface of the subsidiary section to lock the subsidiary section firmly in the socket using a forming or swaging tool 31 as illustrated in FIG. 4.

It will be appreciated that the metal annular wall of the main section assists in supporting the wall of the subsidiary section engaged in the socket when a load is applied to the wall by the engagement of the collet on the tapered cam surface in this subsidiary section.

Since the subsidiary section can readily be manufactured in plastics by moulding with the tapered cam surface 25 moulded into the subsidiary section and the main section of the body can simply be manufactured using conventional machining techniques and there is no need to make special provision for grooves or other location devices in the socket to hold the subsidiary section in the section, the arrangement of the invention provides a simple and relatively cheap method of manufacturing a two part body fitting for a tube covering.

I claim:

1. A body for a tube coupling having a throughway open at one end to receive a tube and a collet for locking the tube in the throughway, the body having a main section and a separately formed subsidiary section in which said one open end is formed, the throughway having a convergent portion in said subsidiary section which reduces towards said open end to form a tapered cam surface encircling the throughway to act on the tube locking collet, the main section of the body member having a socket encircling the throughway in which the subsidiary section engages, and the socket having a peripheral wall that is deformed radially inwardly to engage around at least that part of the subsidiary section containing the convergent portion of the throughway to lock the subsidiary section in the socket to form a unified body and to reinforce the subsidiary section where it is subjected to a load by the collet.

2. A body as claimed in claim 1, wherein the outer surface of said subsidiary section of the body reduces in cross-section towards the open end thereof and said peripheral wall is deformed around the reducing cross-section outer surface of the subsidiary section to lock the subsidiary section in the socket.

3. A body as claimed in claim 2, wherein the peripheral wall of the socket is annular and the outer surface of the subsidiary section is frusto-conical, the annular wall of the socket being deformed against the frusto-conical surface of the subsidiary section to lock the subsidiary section in the socket.

4. A body as claimed in 3, wherein the socket on the main section of the body includes an annular seat formed within the peripheral wall of the socket and with which the subsidiary section is engaged when located in the socket.

5. A body as claimed in claim 1, wherein the main section of the body is formed from a deformable metal and the peripheral wall of the socket is deformed inwardly against the subsidiary section by swaging.

6. A body as claimed in claim 1, wherein the subsidiary section of the socket is a plastics moulding.

* * * * *